Oct. 5, 1954   R. M. CARRIER, JR., ET AL   2,690,835
METHOD OF CONVEYING MATERIAL
Original Filed Feb. 28, 1948   3 Sheets-Sheet 2
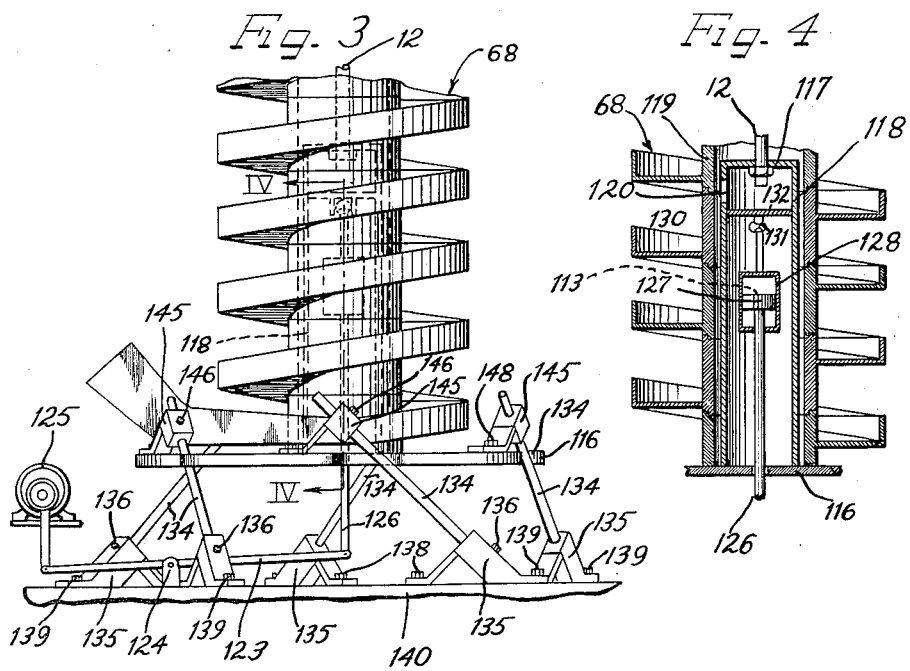
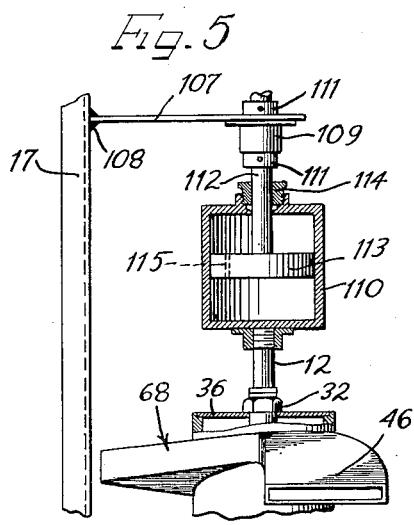
Inventors
ROBERT M. CARRIER JR.
MAURICE G. WHITLEY Oct. 5, 1954     R. M. CARRIER, JR., ET AL     2,690,835
METHOD OF CONVEYING MATERIAL
Original Filed Feb. 28, 1948     3 Sheets-Sheet 3
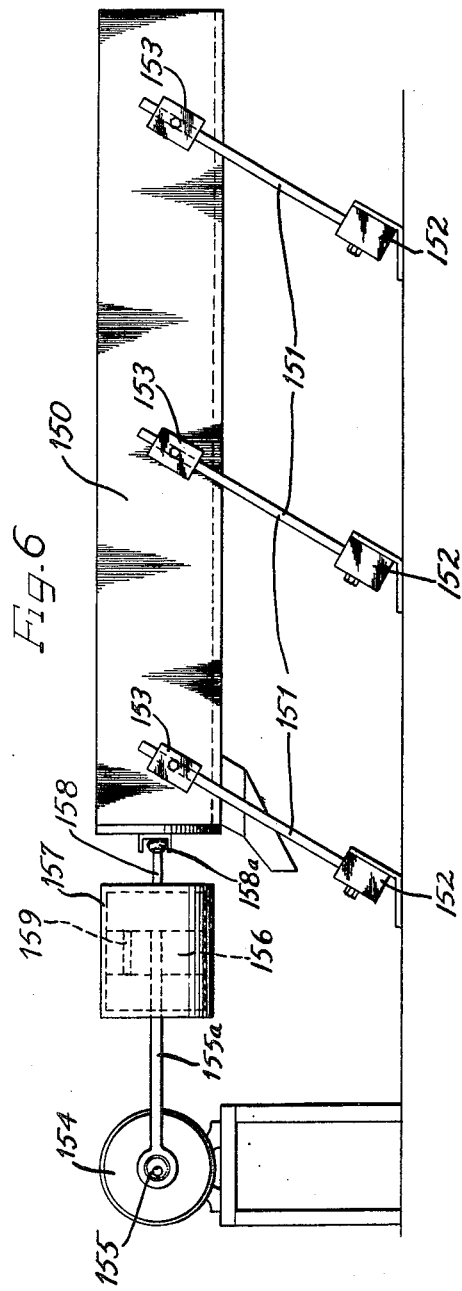
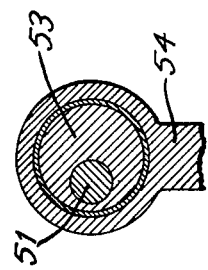
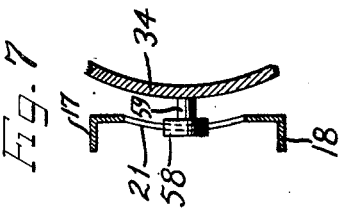
Inventors
ROBERT M. CARRIER JR.
MAURICE G. WHITLEY
by Attys.

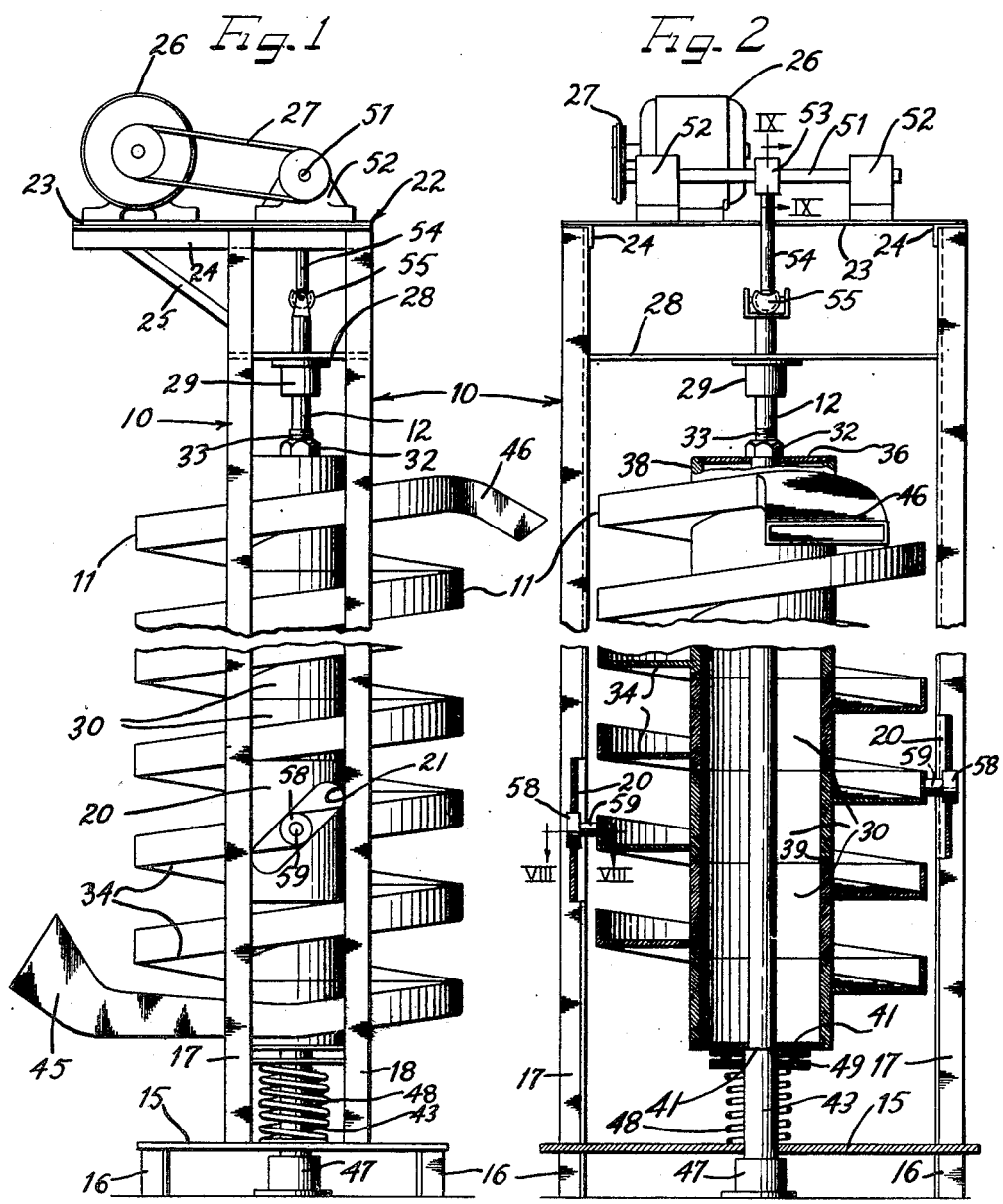

Patented Oct. 5, 1954

2,690,835

UNITED STATES PATENT OFFICE 2,690,835

METHOD OF CONVEYING MATERIAL

Robert M. Carrier, Jr., and Maurice G. Whitley, Louisville, Ky., assignors, by mesne assignments, to Carrier Conveyor Corporation, Louisville, Ky., a corporation of Kentucky Original application February 28, 1948, Serial No. 11,998. Divided and this application September 23, 1950, Serial No. 186,342

1 Claim. (Cl. 198—220)

This invention relates generally to materials handling and more particularly to a method of conveying a material in accordance with the directional throw principle.

The subject matter of this disclosure constitutes a division of our co-pending application U. S. Serial No. 11,998, filed February 28, 1948, now Patent No. 2,630,210.

It has been observed that the inherent elasticity of a spring member endows the spring member with certain physical characteristics, for example, work must be performed in deflecting a spring, however, once deflected, the spring will exhibit a vibration characteristic somewhat similar to the periodic action of a pendulum.

In other words, a spring may comprise one component of a vibrating system having a degree of freedom whereby the spring will vibrate in a predetermined direction.

If a vibrating system partakes of free harmonic vibrations, resisting forces are always present which will cause a gradual damping of the original vibrations either through air or fluid resistance or internal friction of the vibrating body or other interfering forces. It is possible, however, to apply a periodical disturbing force to a vibrating system to produce a forced vibration and in so doing, a magnification factor may be exploited.

We have found that when the frequency of the periodic disturbing force approaches the frequency of natural vibrations of a vibrating system and the damping forces are small, the magnification factor becomes unusually large. The result of this phenomenon is that a small periodical disturbing force may produce a very large forced vibration provided that the periodical disturbing force is in resonance with the natural vibrations of the system and is maintained in resonance.

One of the types of conveyors that has come into use within recent years is the so-called "feeder" conveyor which operates on a directional throw principle. A reciprocating or oscillating plate is moved forwardly and upwardly carrying the material placed thereon along with it, however, the direction of movement thereof is changed rather abruptly and the plate is withdrawn from under the material, allowing it to fall in a new relative position on the plate. The relative movement between the material and the plate not only assists in conveying the material, but the initial movement of the plate is usually of such a character as to partially throw the material in the direction of travel, hence, the identification of such equipment as a directional throw conveyor.

In accordance with the principles of the present invention, we provide a "feeder type" conveyor operable on the directional throw principle and, availing ourselves of the characteristics of a vibrating system partaking of forced harmonic vibrations, operate the conveyor according to a novel method which permits the use of more economical machinery to convey material with greatly increased efficiency.

Briefly, the method of directionally throwing a conveyable material practiced in accordance with the disclosure of the present invention contemplates the supporting of the conveyable material resiliently on spring means having a predetermined selected spring constant. An energy impulse generating means is then operated in resonance with the natural vibrations of the spring means, which, in effect, form a vibrating system. In addition, the energy impulse generating means are positively coupled to the spring means and the entire train of mechanism is vibrated simultaneously at a common fixed and predetermined frequency.

The practice of the method thus provided permits the full exploitation of a high magnification factor due to the advantageous use of the dynamical conditions in the vibrating system so that a very small motor may be employed and the entire conveying apparatus may be economically produced from a simplified structure.

It is an object of the present invention, therefore, to provide a method of directionally throwing a conveyable material which exploits the characteristics of a forced vibration vibrating system.

Another object of the present invention is to provide a method of conveying a material with a vibrating system whereby a large magnification factor may be exploited.

Yet another object of the present invention is to provide a method for conveying a material wherein the material is vibrated in resonance with the natural vibrations of the conveying system apparatus.

Still another object of this invention is to provide a method of causing material to be conveyed up a spiral or in the direction of a trough using the principle of natural frequency in a directional throw type conveyor.

Many other features, advantages, and additional objects of the present invention will become manifest to those versed in the art upon making reference to the detailed description which follows and the accompanying sheets of drawings in which several preferred forms of structure are shown which are capable of practicing the steps of the method of our invention.

On the drawings:

Figure 1 is a fragmentary front elevational view of a spiral conveyor operable in accordance with the principles of the present invention.

Figure 2 is a fragmentary side elevational view partly in section, of the spiral conveyor of Figure 1.

Figure 3 is a fragmentary elevational view of one type of spring mounting which may be provided for the conveyor of Figure 1.

Figure 4 is a fragmentary vertical sectional view taken substantially on line IV—IV of Figure 3.

Figure 5 is a fragmentary elevational view of a modified drive means for the conveyor of Figure 1.

Figure 6 is a side elevational view of a trough type conveyor provided in accordance with the principles of the present invention;

Figure 7 is a horizontal sectional view taken substantially on line VII—VII of Figure 2.

Figure 8 is a fragmentary vertical sectional view taken on line VIII—VIII of Figure 2.

As shown on the drawings:

The embodiment of Figures 1 and 2 includes a frame support structure 10 in which a helical conveying flight 11 is supported for oscillation about a substantially vertical shaft 12 and for reciprocation in a vertical direction relative to the frame structure.

The conveyor is arranged to move material up the flight through a twisting, upward movement at a fixed angle to the angle of climb of the flight. The movement of the flight is then abruptly terminated and reversed whereupon the flight is twisted downwardly so that the material supported on the flight will be partially impelled in the initial general direction of the flight and will also fall on an angularly advanced portion of the flight relative to its starting position.

The frame structure 10 includes a base 15 supported in spaced relation to the floor by foot members 16 disposed at each corner. A pair of vertical angle members 17 and 18 are secured at each side of the base 15 in spaced relationship to one another and carry between them a pair of curved guide plates 20—20 each having a slanted guide slot 21.

A top plate 22 including a platform portion 23 extends outwardly from the frame structure at the upper ends of the angle members 17 and 18 and is additionally braced by angle members 24 and diagonal brace 25, thereby providing a firm support for a motor 26 provided to drive the conveyor through a belt 27.

A second platform member 28 is spaced downwardly from the top of the plate 22 and carries a bearing member 29 in which the shaft 12 is journaled.

The conveying flight comprises a series of separate units 30 secured together on the shaft 12 by means of a nut 32 received on an upper threaded portion 33 of the shaft 12, each of the units 30 including a portion of an upwardly winding trough 34 integrally formed on a length of tubing 35 equal in length to the pitch of the flight.

The nut 32 bears downwardly on a circular closure plate 36 which is seated on a recessed ledge 38 on the upper end of the uppermost tube 35. It will be noted that the lower end of each section of tubing 35 has a downwardly projecting rim 39 which is adapted to seat on the recessed ledge at the upper end of the section of tubing therebelow.

The shaft 12 has an enlarged lower end 43 providing a shoulder 44 against which a bottom closure plate 41 abuts when the nut 32 is drawn up on the shaft 12, thereby placing the several flight units in firm assembly for co-rotation with the shaft 12.

A loading chute 45 is secured to the bottom unit of the conveyor and a discharge chute 46 is also secured to the top unit of the conveyor.

In accordance with the principles of the present invention, the shaft 12 is journaled in a bearing 47 but is resiliently mounted on a coil spring 48, thereby establishing a vibration system. An anti-friction bearing assembly 49 is freely disposed about the shaft 12 between the spring 48 and the bottom closure plate 41 so that the shaft 12 will be free to oscillate.

It will be understood that the coil spring 48 will have a predetermined spring constant which will determine the natural vibrating frequency of the vibrating system, however, the natural vibrating frequency of the entire system may be selectively varied by securing one or more coil springs between the platform 49 and base plate 15.

In order to impart a reciprocating movement to the helical conveying flight 11, a drive shaft 51 journaled in a pair of bearing blocks 52 mounted on the top plate 22 is rotated through a pulley drive from the motor 26. An eccentric 53 is carried by the drive shaft 51 and engages a connecting rod 54 operatively connected to the upper end of the conveyor shaft 12 through a ball joint 55. A train of mechanism is thus provided to impart a periodical disturbing force to the vibration system.

In order to oscillate the conveyor flight 11, a pair of rollers 58 are each rotatably secured on a corresponding axle 59, each axle being rigidly fixed to opposite sides of the trough 34 and arranged so the rollers 58 will engage one of the slanted guide slots 21 formed in each of the curved plates 20 (Figure 8). Thus, as the conveyor flight is reciprocated vertically, the rollers 58 moving through the guide slots 21 will cam the flight along an oscillatory path relative to the center axis of the flight, the angularity of the slots determining the degree of oscillation.

In Figure 5, a modified driving mechanism is shown which includes a leaf spring 107 welded as at 108 to one of the frame members 17 and carrying a bearing 109 through which a shaft 112 passes freely. A pair of collars 111 are keyed to the shaft 112 above and below the bearing 109 whereby the shaft is free to rotate but must vibrate vertically with the bearing 109 and the leaf spring 107.

A cylinder 110 is mounted on a shaft 12 to which the flight conveyor 68 is assembled and a piston 113 is secured to the lower end of the shaft 112 and is adapted to be reciprocated in the cylinder 110. A seal 114 is provided to preclude leakage of fluid outwardly from the cylinder along the shaft 112. The cylinder 110 is filled with a fluid such as oil and a restricted orifice 115 is provided in the piston 113 to afford restricted flow communication between opposite sides of the piston 113.

It will be understood that the restricted orifice 115 will permit the passage of the fluid from one side of the piston to the other under the effect of a slow displacement produced, for example, by the yielding movement of the conveyor flight 68 under the influence of increased load, however, rapid relative movement as when a periodic disturbing force is applied will result in movement of the piston 113 in such a manner as to cause the cylinder 110 to be moved in synchronism therewith. Thus, the shaft 112 together with the piston 113 and the cylinder 110 together with the shaft 12 will function as a relatively rigid link when the relative speed of movement between the shaft 112 and the shaft 12 exceeds a predetermined minimum governed by the selection of the size of the orifice 115.

Referring now to Figures 3 and 4, an additional driving means is shown as including a lower platform 116 having a sleeve 118 mounted thereon closed at its upper end by an end member 117 centrally apertured to receive the end of the shaft 12. A nut 119 may be adjusted on the shaft 12 through an opening 120 formed in the sleeve 118.

A lever 123 pivoted in a fulcrum 124 is moved up and down by an eccentric mechanism driven from a drive means 125 similar to the motor 26 of Figure 1. The lever 123 is pivotally connected to a push rod 126 extending through the platform 116 and upwardly inside the sleeve 118 for connection at its upper end to a piston 127 slidably mounted in a cylinder 128. The cylinder 128 is supported by a rod 130 which in turn is connected to the sleeve 118 through a ball joint 131 connected to a disk 132 welded across the inside of the sleeve 118. A restricted orifice 133 is formed in the piston 127 to establish restricted flow communication through the piston. Thus, the fluid cylinder 128 will act in the same manner as the cylinder 110 of Figure 6 to permit the conveyor to float on the spring mounting.

A plurality of cantilever type spring arms 134 are each adjustably held in a corresponding plurality of blocks 135 by means of a set screw 136 and each block 135 is secured by bolts 138 and 139 to a suitable base 140. Near its upper end, each spring arm 134 passes through a segmental circular cut-out portion 144 formed in the platform 116. A block 145 is adjustably secured to each spring arm 134 by set screws 146 and each block 145 has a slanted brace 147 pivotally secured by a cap screw 148 to the platform 116. It will be understood that the adjustment means permits selective variation of the natural vibrating frequency of the vibrating system.

In Figure 6, the principles of the present invention are practiced with a trough-type conveyor which includes a trough 150 mounted substantially horizontally on a plurality of cantilever type spring rods 151, each of the spring rods 151 being adjustably secured in a plurality of blocks 152 and 153 arranged on both sides of the trough 150.

A motor 154 is provided having a power take-off shaft to which is attached an eccentric 155 operatively connected to a connecting rod 155a having a piston 156 slidably mounted in a fluid cylinder 157 firmly assembled on the end of a shaft 158 having a ball joint 158a on the end thereof connected to the conveyor trough 150. A restricted orifice 159 is formed in the piston 156 so that the connecting rod 155a together with the piston 156 and the cylinder 157 together with the shaft 158 will operate as a relatively rigid link when a rapid relative movement occurs therebetween. However, under the influence of a relatively slow displacement, the restricted orifice provides restricted communication between opposite ends of the cylinder to permit adjustments in length of the linkage so that the conveyor trough 150 may settle on the cantilever type spring 151 under the influence of additional conveying load.

We have observed that when a periodic disturbing force of low frequency is applied to a vibrating system having a comparatively high natural vibration frequency, the magnification factor decreases, however, as the frequency of the periodic disturbing force approaches the frequency of natural vibrations of the system, the magnification factor becomes large. Insofar as practicing methods of conveying material with a vibrating system is concerned, this means that a very small periodical disturbing force may be employed to produce a proportionately large forced vibration provided that the periodical disturbing force is in resonance or very nearly approaches resonance with the natural vibration frequency of the vibrating system and is maintained in resonance with the natural vibration frequency of such system.

One of the important steps of the method herein disclosed and to be practiced with the various types of structural embodiments described in detail above, therefore, includes the step whereby the energy impulse generating means employed to provide a periodical disturbing force and the vibrating system, the characteristics of which are determined by the spring support, are operated simultaneously through a relatively rigid physical coupling so as to vibrate at a common fixed and predetermined frequency. Thus, by operating the impulse generating means or motor at a fixed predetermined speed the periodical disturbing force will always remain in resonance with the natural vibration frequency of the system and the forced vibration technique may be successfully employed to fully exploit a magnification factor of high quantitative value which results when the frequency of the disturbing force approaches the frequency of natural vibrations of the system.

In operation, therefore, the structures described in detail herein are employed to support a conveyable material resiliently on a vibrating system, the frequency characteristics of which being established primarily through spring means having a predetermined spring constant. An energy impulse generating means is operated at a predetermined fixed impulse frequency which bears a predetermined proportional relationship to the natural vibration frequency of the vibrating system in order to provide a periodical disturbing force. The periodic disturbing force is applied to the vibrating system whereupon energy impulses are imparted to the supported material to throw the material directionally. The energy impulse generating means and the spring means are physically coupled and locked together for synchronous operation so that the periodical disturbing force provided by the energy impulse generating means may at all times approach very nearly the frequency of the natural vibrations of the vibrating system or, in other words, may substantially equal the natural frequency of the vibrating system. Thus, the energy impulse generating means and the spring means or vibrating system are operated simultaneously at a common fixed and predetermined frequency with the result that we advantageously exploit a high magnification factor and are able to convey more material quickly with an improved economical apparatus which requires comparatively small driving means.

We intend to embody within the scope of this invention, of course, all such modifications as reasonably and properly come within the scope of our contribution to the art.

We claim as our invention:

The method of conveying which comprises supplying conveyable material to a resiliently mounted material support structure having a predetermined undisturbed natural frequency of vibration along a predetermined path oblique to the material supporting surface of the structure thereby causing the structure to settle on its resilient mounting to a level according to the load of the material on the structure, and imposing a positive disturbing force to the structure which is substantially in synchronism with such natural frequency, and which is of substantially uniform amplitude equidistant above and below the level to which the structure has settled under the load of material thereon.

References Cited in the file of this patent

UNITED STATES PATENTS

| Number | Name | Date |
|---|---|---|
| 2,280,056 | Broekhuysen | Apr. 21, 1942 |
| 2,334,368 | Wolf | Nov. 16, 1943 |